US005467798A

United States Patent [19]

Baker et al.

[11] Patent Number: 5,467,798

[45] Date of Patent: Nov. 21, 1995

[54] REFILL-PREVENTING VALVE FOR NON-REFILLABLE CONTAINERS

[75] Inventors: George D. Baker; V. Russell Henry, both of Cambridge, Md.

[73] Assignee: Liquid Air Corporation, Walnut Creek, Calif.

[21] Appl. No.: 160,172

[22] Filed: Dec. 2, 1993

Related U.S. Application Data

[63] Continuation of Ser. No. 977,801, Nov. 17, 1992, abandoned.

[51] Int. Cl.[6] .......... F16K 15/00

[52] U.S. Cl. .......... 137/614.2; 222/147

[58] Field of Search .......... 137/614.17, 614.2; 222/147

[56] References Cited

U.S. PATENT DOCUMENTS

| | | | |
|---|---|---|---|
| 879,000 | 11/1908 | Pitner | 222/147 |
| 2,019,251 | 10/1935 | Cooke . | |
| 2,051,589 | 8/1936 | Allen et al. | 137/614.17 X |
| 2,066,889 | 1/1937 | Kay | 222/147 X |
| 2,626,723 | 12/1950 | Onorato . | |
| 2,828,054 | 3/1958 | Chiaramonte . | |
| 3,263,849 | 8/1966 | Hagen . | |
| 3,421,547 | 1/1969 | Aslan . | |
| 3,552,432 | 1/1971 | Wagner . | |
| 3,589,397 | 6/1971 | Wagner . | |
| 3,756,277 | 9/1973 | Shaw | 137/614.2 |
| 3,985,332 | 10/1976 | Walker . | |
| 5,018,552 | 5/1991 | Politi et al. . | |

FOREIGN PATENT DOCUMENTS

| | | |
|---|---|---|
| 0008662 | 3/1980 | European Pat. Off. . |
| 2367238 | 10/1976 | France . |
| 2583138 | 12/1986 | France . |
| 2634852 | 2/1990 | France . |
| 8367 | 12/1879 | Germany . |
| 299280 | 4/1916 | Germany . |
| 2555928 | 6/1977 | Germany . |
| 2176586 | 12/1986 | United Kingdom . |

OTHER PUBLICATIONS

"Non–Refillable Cylinder Valve" drawing dated Sep. 20, 1984, by V. R. Henry, No. SK005–62, Cambridge, Md.

*Primary Examiner*—John C. Fox

*Attorney, Agent, or Firm*—Burns, Doane, Swecker & Mathis

[57] ABSTRACT

A non-refill valve for a non-refillable container, comprising a valve body having an inlet and an outlet and a passage through the valve body interconnecting the inlet and the outlet. A valve stem slides in the passage and has an axial passageway that extends partway therethrough and that terminates laterally in a passageway that extends through a side wall of the stem intermediate the ends of the stem. A ball in the stem rests on a seat on the stem and closes the valve stem passageway against the flow of gas from the outlet towards the inlet. A first spring urges the ball against the seat to permit flow of gas only in a direction from the inlet to the outlet by displacing the ball from the seat against the action of the first spring in an open position of the valve. A second spring urges the stem in the direction of the flow of gas from the inlet to the outlet, and a seal acts between the stem and the valve body. The second spring urges the seal into sealing relation with the valve body in a closed position of the valve, whereby when a coupling is attached to the valve body, the coupling urges the stem in a direction opposite the first-mentioned direction and against the action of the second spring to move the seal out of sealing relation with the valve body, thereby to establish communication between the inlet and the outlet when the pressure of a gas in the inlet is sufficient to move the ball off the seat against the action of the first spring.

10 Claims, 2 Drawing Sheets

REFILL-PREVENTING VALVE FOR NON-REFILLABLE CONTAINERS

This application is a continuation of application Ser. No. 07/977,801, filed on Nov. 17, 1992 now abandoned.

FIELD OF THE INVENTION

The present invention relates to a refill-preventing valve for non-refillable containers such as high pressure cylinders for gases.

BACKGROUND OF THE INVENTION

Such cylinders are often designed for single-fill use and may be obliged by governmental regulation to have a device which prevents them from being refilled.

Various refill prevention devices are known which employ, e.g., the principle of triggering. In these devices, the cylinder is filled with gas and then a trigger is activated that releases a check valve mechanism within the valve. Such devices require those performing the filling operation to know before filling the cylinder that the operation of a refill prevention device is needed. Such a device is the subject of U.S. Pat. No. 5,018,552.

In such known devices, the check valve mechanism is continuously exposed to the gas within the cylinder and so there is the danger that the gas can interact with parts of the check valve.

Another refill prevention device is of the type of U.S. Pat. Nos. 3,552,432 and 3,589,397. In each of these, a handle can be screwed into and out of a housing so as to control the flow of gas through the housing. When the handle is in its farthest outward position, a container to which the housing is secured can be filled. In its farthest inward position, the handle closes the container; and in an intermediate position to which the handle can be backed off, the pressurized contents of the container can be dispensed. After filling, a portion of the housing is crimped to prevent retrograde movement of the handle beyond that intermediate position, so that the handle can no longer be withdrawn to the point that the container can be refilled.

A somewhat similar device is disclosed in U.S. Pat. No. 3,985,332, in which a hollow knob has three similar positions, namely, an outermost position in which the container can be filled, an innermost position in which the container is closed, and an intermediate position in which gas under pressure can be dispensed from the container. Upon the completion of filling and the movement of the hollow knob to the innermost position, an outwardly biassed spring snaps outwardly to prevent retrograde movement of the handle outwardly beyond the intermediate position.

In French Patent 2 634 852, a frangible rod holds a valve member withdrawn until after filling. Once the container is filled, the rod is ruptured and the valve member thereafter closes the container or permits gas to be withdrawn from the container, but does not permit refilling of the container.

In U.S. Pat. No. 2,019,251, a filling spout is provided which, after filling, is covered by a cap that masks the filling spout and can be screwed onto the container but not screwed off. A one-way valve permits exit of fluid from the container but prevents entry of fluid into the container by any route other than that which is exposed in the absence of the cap.

German Patent No. 299,280 discloses a device in which a liquid soluble retainer holds a ball in a raised position long enough to permit filling of the container, after which the retainer dissolves and the ball falls to a position in which the ball will permit only one-way movement of fluid past the ball, that is, the ball permits the discharge of fluid from the container but prevents refilling of the container.

EP 0 008 662 discloses an annular flap valve structure that is deformable to permit filling and emptying of a container but not to permit refilling.

These latter patents have various disadvantages: they may be useful only with a liquid, not a gas; or they require a difficult and time-consuming and expensive assembly; or they require special knowledge or skill of the person who fills the container or who prepares the container for shipment to the customer.

OBJECTS OF THE INVENTION

It is an object of the present invention to overcome these drawbacks.

More particularly, it is an object of the invention to provide a refill-preventing valve for non-refillable containers, which requires no special manipulation in its installation or use.

Still another object is the provision of such a valve, which can be of standard sizes and fitted easily to standard containers.

A still further object of the present invention is the provision of such a valve, which requires no triggering device.

Finally, it is an object of the present invention to provide such a valve, which will be relatively simple and inexpensive to manufacture, easy to install and operate, and rugged and durable in use.

SUMMARY OF THE INVENTION

According to the invention, these objects are achieved by providing a refill-preventing valve for nonrefillable containers, in which a valve stem is moved inwardly toward the interior of the container when a coupling is attached to the valve. Movement of the stem places a passageway through the stem in communication with the interior of the container; and the pressure of gas in the container then moves a ball off a seat, which ball otherwise closes the passageway through the stem under the action of a first spring. In the absence of the coupling, however, a second spring acting in opposition to the first spring urges the stem to a position in which the passageway through the stem is sealed from communication with the interior of the container.

BRIEF DESCRIPTION OF THE DRAWINGS

These and other objects, features and advantages of the present invention will become apparent from a consideration of the following description, taken in connection with the accompanying drawings, in which.

DETAILED DESCRIPTION OF THE INVENTION

Figure 1:
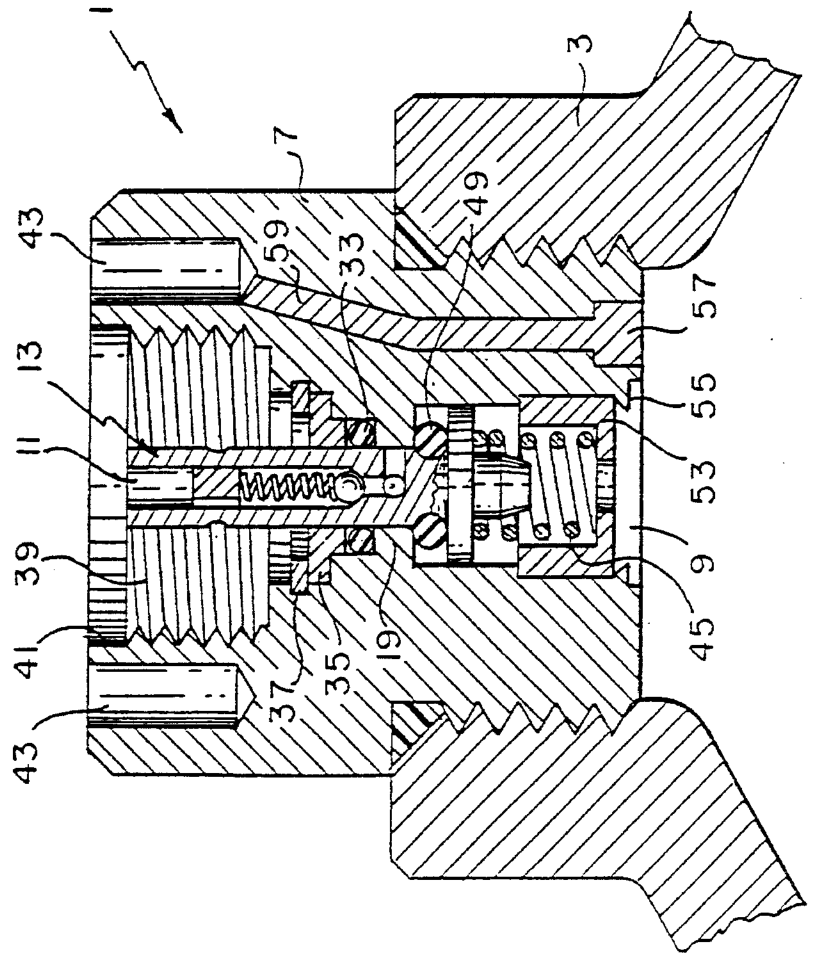
FIG. 1 is a cross sectional view of a valve according to the present invention in its closed position, installed in the neck of a container for gas under pressure.

Referring now to the drawings in greater detail, and first to FIG. 1 thereof, there is shown a valve indicated generally at 1, screw threadedly and sealingly received in the neck of a cylinder 3 for a gas under pressure.

Figure 3:
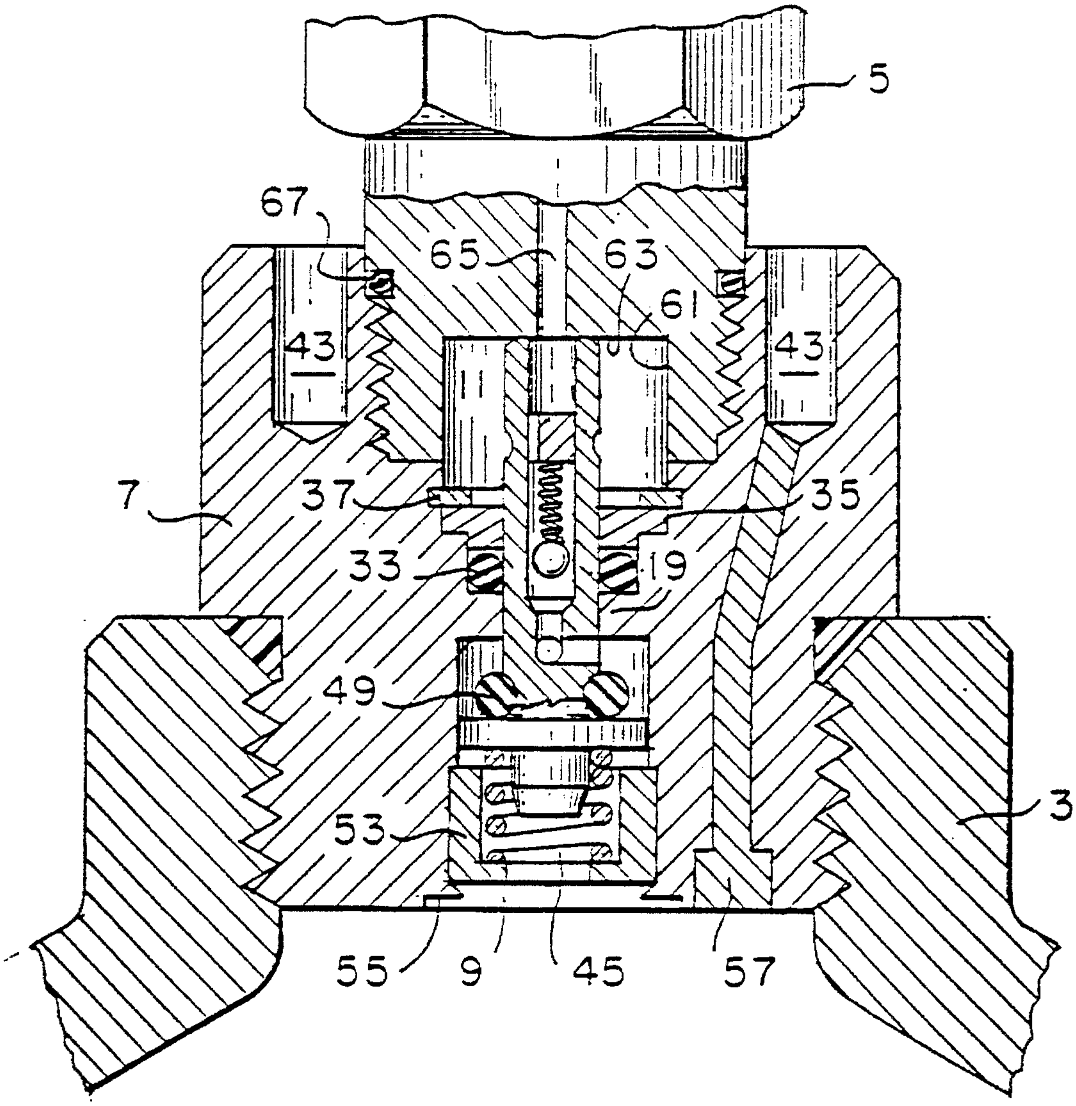
FIG. 3 is a view similar to FIG. 1 but showing a coupling connected to the valve and opening the stem thereby to establish communication between the interior of the container and a passageway through the coupling.

As shown in FIG. 3, a coupling 5 is adapted to be screw threadedly and sealingly connected to valve 1, thereby to receive gas from the interior of cylinder 3 and to transmit the gas to a use therefor (not shown).

Turning back to FIG. 1, it will be seen that the valve 1 comprises a body 7 having an inlet 9 and an outlet 11. A valve stem 13 is slidable axially in body 7.

Figure 2:
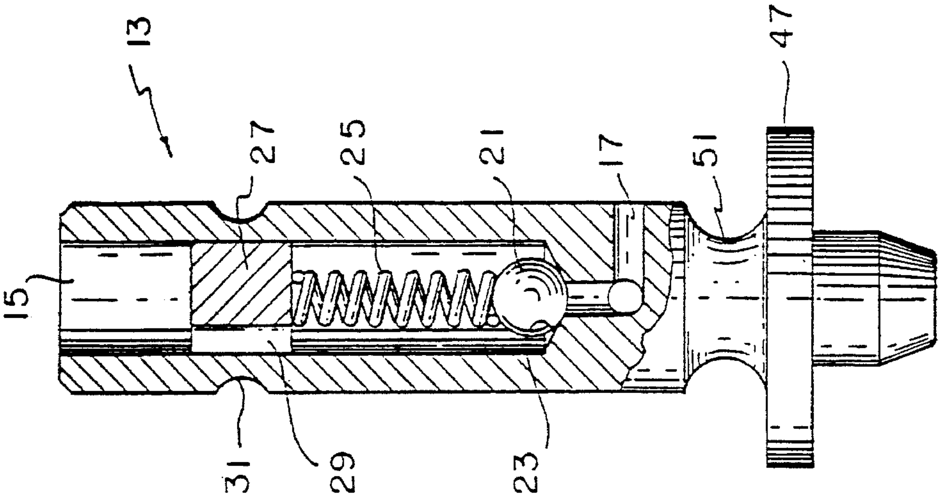
FIG. 2 is an enlarged partially cross sectional view of the valve stem of FIG. 1, again in the closed position.

Turning now to FIG. 2, it will be seen that valve stem 13 has an axial passage 15 partway therethrough, which terminates at its end opposite outlet 11 in a lateral passage 17 that extends out through a cylindrical side wall of stem 13.

Stem 13 is so positioned relative to valve body 7 that, in the closed valve position shown in FIG. 1, lateral passage 17 opens onto and hence is closed by an annular inwardly extending flange 19 integral with valve body 7.

Turning back to FIG. 2, it will be seen that a ball 21 partially occupies but does not close an enlarged upper portion of axial passage 15 within stem 13. Ball 21 is of an elastomer such as nitrile or Buna N or fluorocarbon rubber and rests sealingly on an annular seat 23 provided in passage 15. Ball 21 is urged into sealing relation against seat 23 by a coil compression spring 25 that acts between ball 21 and a retainer 27 having a passageway therethrough to permit the free flow of gas axially within passage 15 from the underside to the upper side of retainer 27 as seen in FIG. 2. Retainer 27 is fixed within passage 15 by crimping the stem 13, as shown at 31.

Annular flange 19 forms the lower wall of a sealing chamber within which is disposed an O-ring 33 that sealingly rolls against the outer cylindrical surface of stem 13. The upper side of the chamber that receives O-ring 33 is closed by a retaining ring 35 held in place by a circlip 37.

Above circlip 37, the internal bore of body 7 enlarges into a screw threaded portion 39 that terminates upwardly in a cylindrical wall 41.

Holes 33 for receiving a spanner wrench are spaced regularly about the periphery of body 7 at the top thereof as seen in FIG. 1, to receive the prongs of a wrench suitable for applying and removing valve 1 to and from cylinder 3.

A coil compression spring 45 continuously urges stem 13 to the raised or closed position shown in FIG. 1. Spring 45 acts against the underside of a flange 47 integral with stem 13. Flange 47 rides within the bore of body 7 but does not seal against that bore; instead, there is ample room for gas from the container to pass the periphery of flange 47. Alternatively, flange 47 can slide in the bore of body 7 and be provided with openings therethrough (not shown) for the passage of gas therepast.

On the upper side of flange 47 as seen in FIG. 1, there is an O-ring 49 which is retained in an annular groove 51 best shown in FIG. 2. In the FIG. 1 position, in which the valve is closed against the passage of gas in either axial direction, O-ring 49 is pressed sealingly against the underside of annular flange 19 under the action of spring 45.

At its lower end, spring 45 acts against the upper side of a radially inwardly directed flange on a retainer 53 that in turn is held in the bore of body 7 by tangs 55 struck from the material of body 7 at several places about the periphery of retainer 53.

As is conventional in pressure vessels, a low melting alloy 57 fills a passageway 59 through body 7 which, for purposes of convenience, opens at one end through one of the holes 43. When required, this low melting alloy provides for the valve a safety relief in the event of over-pressure caused by heating.

As mentioned before, the screw threaded portion 39 of the body bore screw threadedly receives the coupling 5, which coupling 5 has a recess 61 in its lower end as seen in FIG. 3. Recess 61 terminates in a bottom 63 which is traversed by an axial passage 65 which provides an outlet for gas from the container. An O-ring 67 received in the periphery of coupling 5 seals against cylindrical wall 41 in the assembled condition of the parts shown in FIG. 3.

The operation of the valve is as follows:

To fill the container, valve 1 is screwed into container 3 and coupling 5 is not in place, so that the parts have the position shown in FIG. 1. Also, at the time of filling, ball 21, spring 25 and retainer 27 have not yet been inserted in the stem 13.

A filling connection (not shown) which can be generally similar to coupling 5, is then screwed into screw-threaded portion 39, depressing stem 13 from the FIG. 1 to the FIG. 2 position. This opens a filling passageway, between the filling coupling and the interior of the container, as can be seen from FIG. 3.

Upon the completion of filling, the filling coupling is unscrewed and the parts resume the FIG. 1 position, so that the container is sealed against the exit of gas therefrom.

The container can be shipped to the customer in this condition, that is, without ball 21, spring 25 and retainer 27. In that case, however, the container is refillable.

Alternatively, to render the container non-refillable, the ball 21 and spring 25 and retainer 27 are inserted in stem 13 and crimping 31 is performed to stem 13, whereupon retainer 27 is fixed in the position shown. Of course, retainer 27 is inserted to a sufficient depth and with sufficient force to compress spring 25 to predetermine the pressure at which ball 21 will move off seat 23, thereby to open outlet 11.

When it is desired to remove gas from the container, the coupling 5 is screwed into screw threaded portion 39. When the bottom 63 of recess 61 contacts the upper end of stem 13, stem 13 is moved from the position shown in FIG. 1 to the position shown in FIG. 3. O-ring 49 is carried out of sealing relation with annular flange 19 by annular groove 31.

In this latter position, gas is free to flow into inlet 9 of valve 1, past spring 43 and past or through flange 47, about O-ring 49, and into lateral passage 17 which is now exposed below flange 19, as seen in FIG. 3. From lateral passage 17, the gas under pressure raises ball 21 off seat 23 as shown in FIG. 3, thereby compressing spring 25. The gas flows about ball 21 and through passage 29 in retainer 27, and thence through outlet 11 and into the aligned passage 65 in coupling 5. Leakage of gas about the periphery of coupling 5 is prevented by O-ring 67.

It should be noted that, thanks to the construction of the present invention, the gas in cylinder 3 does not come into contact with the valve mechanism downstream of O-ring 49 until the time of use. Hence, if this is a corrosive or reactive gas, the valve will not be damaged.

It will also be noted that no trigger mechanism is required to be provided or manipulated in order to prevent refill of the container. Hence, the user of the container need not perform any special manipulation in connection with the discharge of gas from the container: applying the coupling 5 automatically establishes the through connection.

It will further be noted that there is only a very small structural difference between a refillable container and a non-refillable container according to the present invention. Therefore, the valve of the present invention may be provided in any of a variety of standard sizes, all of which can be simply and easily converted from a refillable container to a non-refillable container with only three parts that are standard to all sizes of valve.

Still further, it will be noted that those filling the container need pay no attention to the question whether refilling is to be prevented: all containers that pass through the filling station and then are stored, will lack the ball 21, the spring 25 and the retainer 27. Only if the customer requires the non-refillable feature, will the filled containers, when taken out of storage, be provided with the non-refilling structure prior to shipment to the customer.

It is also to be noted that, although the primary purpose of the present invention is to prevent refilling of the container, it is also useful in order to prevent the customers from contaminating reactive gas mixtures with moisture or air, which might render the gas mixtures unstable and/or unsuitable for use as calibration standards.

Finally, it will be noted that the construction of the valve of the present invention is simple, inexpensive, rugged and durable.

It will accordingly be clear that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A non-refill valve for a non-refillable container, comprising a valve body having an inlet and an outlet and a passage through the valve body interconnecting the inlet and the outlet, a valve stem slidable in said passage, the valve stem having an axial passageway that extends partway therethrough and that terminates laterally in a passageway that extends through a side wall of the stem intermediate the ends of the stem, a ball in the stem that rests on a seat on the stem and that closes said valve stem passageway against the flow of gas from said outlet towards said inlet, first resilient means urging the ball against said seat to permit flow of gas only in a direction from said inlet to said outlet by displacing the ball from the seat against the action of said first resilient means in an open position of said valve, second resilient means urging the stem in the direction of the flow of gas from said inlet to said outlet, and sealing means between the stem and the valve body, said second resilient means yieldably urging said sealing means into sealing relation with said valve body in a closed position of said valve, whereby when a coupling is attached to said valve body, said coupling urges said stem in a direction opposite the first-mentioned direction and against the action of said second resilient means to move said sealing means out of sealing relation with said valve body, thereby to establish communication between said inlet and said outlet when the pressure of a gas in said inlet is sufficient to move said ball off said seat against the action of said first resilient means.

2. A non-refill valve as claimed in claim 1, said body having a radially inwardly extending annular flange in sliding contact with an outer surface of said stem, said lateral passage confronting said flange in said closed position of the valve and being displaced from said flange in said open position of the valve.

3. A non-refill valve for a non-refillable container, comprising a valve body having an inlet and an outlet and a passage through the valve body interconnecting the inlet and the outlet, a valve stem slidable in said passage, the valve stem having an axial passageway that extends partway therethrough and that terminates laterally in a passageway that extends through a side wall of the stem intermediate the ends of the stem, an obturator in the stem that rests on a seat on the stem and that closes said valve stem passageway against the flow of gas from said outlet towards said inlet, first resilient means in said valve stem passageway urging the obturator against said seat to permit flow of gas only in a direction from said inlet to said outlet by displacing the obturator from the seat against the action of said first resilient means in an open position of said valve, a separate retainer fixed in said valve stem passageway and against which said first resilient means acts, second resilient means urging the stem in the direction of the flow of gas from said inlet to said outlet, and sealing means between the stem and the valve body, said second resilient means yieldably urging said sealing means into sealing relation with said valve body in a closed position of said valve, whereby when a coupling is attached to said valve body, said coupling urges said stem in a direction opposite the first-mentioned direction and against the action of said second resilient means to move said sealing means out of sealing relation with said valve body, thereby to establish communication between said inlet and said outlet when the pressure of a gas in said inlet is sufficient to move said obturator off said seat against the action of said first resilient means.

4. A non-refill valve as claimed in claim 3, said stem being crimped inwardly against said retainer thereby to fix said retainer in said valve stem passageway.

5. A non-refill valve usable in conjunction with a container to prevent the container from being refilled, comprising a valve body having an inlet, an outlet and a passage extending between the inlet and the outlet, a valve stem having a passageway extending therethrough for allowing fluid to flow from the inlet of the valve body to the outlet of the valve body, said valve stem being movably positioned within the passage in the valve body for repeated movement between a first position in which fluid flow from the inlet into the passageway is permitted and a second position in which fluid flow from the inlet into the passageway is prevented, flow control means positioned within the passageway in the valve stem for closing the passageway in the valve stem to prevent the container from being refilled by preventing fluid flow through the passageway in the direction toward the inlet and for permitting fluid flow through the passageway in the direction toward the outlet when fluid pressure adjacent the inlet exceeds a predetermined amount, first urging means for urging the valve stem toward said second position and for allowing the valve stem to be moved to the first position in which fluid flow from the inlet to the passageway is permitted.

6. A valve as claimed in claim 5, wherein said flow control means includes a valve seat formed in the passageway, a valve member positioned within the passageway and second urging means for urging the valve member into sealing engagement with said valve seat.

7. A non-refill valve as claimed in claim 5, wherein said valve body includes an annular inwardly extending flange, the passageway in said valve stem including an axially extending portion and a laterally extending portion that opens to the side wall of the valve stem at an opening, said opening being covered by the inwardly extending flange of the valve body when the valve stem is urged to the second position by the first urging means.

8. A non-refill valve as claimed in claim 7, including sealing means encircling the valve stem for sealing the passage when the valve stem is in the second position.

9. A non-refill valve as claimed in claim 8, wherein said sealing means includes an O-ring, said valve stem including an enlarged flange and said O-ring being located between said flange on the valve stem and the flange on the valve body.

10. A valve as claimed in claim 5, wherein said flow control means includes a spring biased valve member positioned within the passageway in the valve stem.

* * * * *